Feb. 23, 1965   W. D. BUCKINGHAM   3,171,057
NUCLEAR FLASH SIMULATOR
Filed July 19, 1960   2 Sheets-Sheet 1
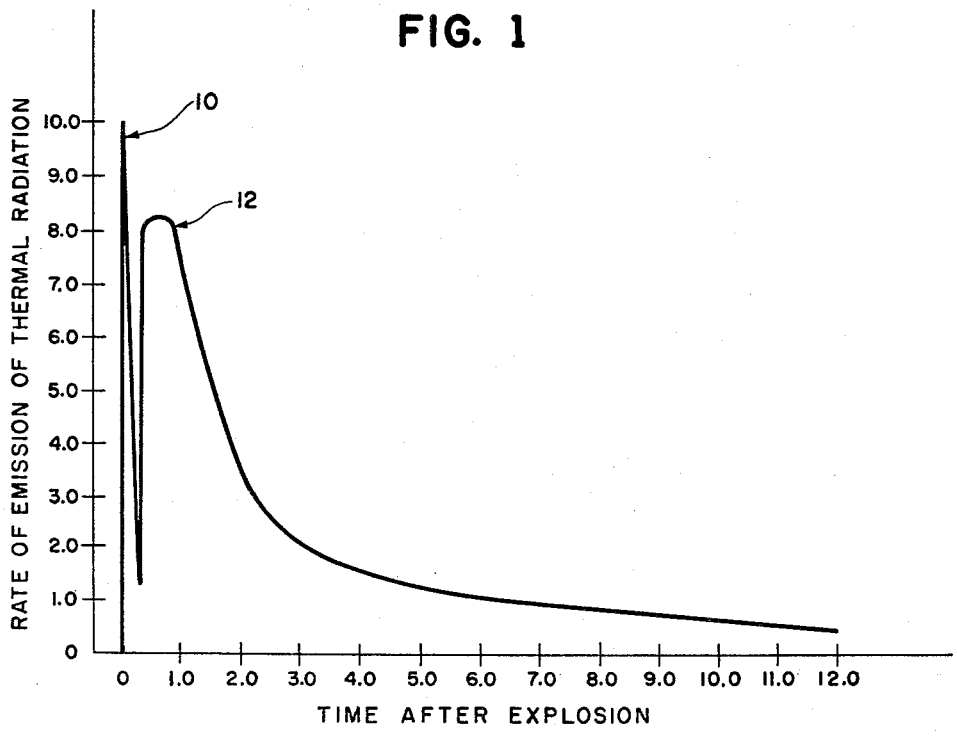
EMISSION OF THERMAL RADIATION - TWO PULSES
FIG. 3
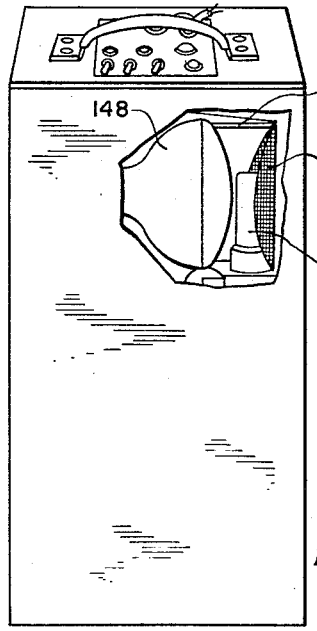
FIG. 4
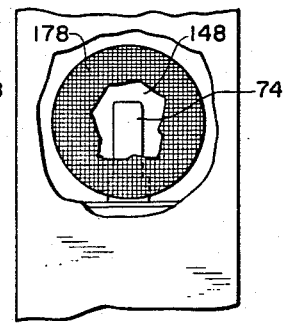
INVENTOR.
W. D. BUCKINGHAM
BY Eli Weiss
ATTORNEY Feb. 23, 1965   W. D. BUCKINGHAM   3,171,057
NUCLEAR FLASH SIMULATOR
Filed July 19, 1960   2 Sheets-Sheet 2

INVENTOR.
W. D. BUCKINGHAM
BY Eli Weiss
ATTORNEY

United States Patent Office 3,171,057
Patented Feb. 23, 1965

3,171,057
NUCLEAR FLASH SIMULATOR
William D. Buckingham, Southampton, N.Y., assignor to
The Western Union Telegraph Company, New York,
N.Y., a corporation of New York
Filed July 19, 1960, Ser. No. 43,903
18 Claims. (Cl. 315—241)

This invention relates generally to a flash generator and more particularly to a device which simulates the thermal energy flash generated during the occurrence of a nuclear bomb explosion.

Briefly, three primary forms of energy are released during the detonation of a nuclear bomb.

A first type of energy released appears in the form of light and heat, comprises approximately one-third of the total energy released, and is generally referred to as thermal radiation. This first type of energy travels almost instantaneously, is very intense and can start fires and cause skin burns at considerable distances.

A second type of energy released is referred to as initial nuclear radiation. This type of energy consists of gamma rays and neutrons, and accounts for approximately three percent of the total energy released. While the intensity of this energy decreases sharply with distance it could produce serious skin burns at a point positioned remote from the blast where initial nuclear radiation would not cause observable injury.

A third type of energy, and that which is responsible for the largest part of the destructive action of the nuclear bomb is the blast wave. While this type of energy is intense, it is relatively slow moving—the time of its arrival depending upon the energy yield of the explosion and the distance involved. For example, at a point located one mile from a one megaton blast, the blast wave would arrive about four seconds after the occurrence of the thermal radiation form of energy.

Presently, devices are being developed to detect the occurrence of a nuclear bomb explosion by being selectively sensitive to the occurrence of one of the three types of energy generated.

Unfortunately, however, of the three types of energy released during the occurrence of a nuclear bomb explosion—the blast wave is not only relatively slow moving but it is also very destructive. It is highly possible that if the blast wave is to be utilized to indicate the presence of a nuclear bomb explosion it could destroy the detector device before the information desired could be transmitted and, in some instances, the time delay between the occurrence of the explosion and its detection could be objectionable. The initial nuclear radiation type of energy generated during a nuclear bomb explosion has a very short effective range and, therefore, unless the detector is relatively close to the blast area it is very possible that a nuclear explosion will not be detected. Additionally, at short distances from an explosion, the blast wave arrives at almost the same instant that the initial nuclear radiation arrives. Therefore, it is very possible that the initial nuclear radiation might destroy the detector device before it could transmit the information desired.

The thermal radiating type of energy, which is not like the other two types of energy, has a very high level of intensity and a relatively high speed of propagation; two factors which facilitate the detection of the occurrence of a nuclear bomb explosion located many miles distant almost immediately.

In addition, the thermal radiation generated during the occurrence of a nuclear blast has a unique wave shape which aids greatly in distinguishing it from all natural sources of thermal radiation.

Obviously, therefore, to detect the occurrence of a nuclear bomb explosion it is advisable to utilize the thermal radiation generated. However, it readily becomes apparent that devices which are selectively sensitive to the thermal radiation generated by a nuclear explosion must not only be calibrated accurately, but they must also be tested periodically for operational defects. Naturally, the calibrating and testing procedures cannot be accomplished by actually detonating a nuclear bomb—but, it can be accomplished quickly and economically by simulating the thermal energy generated during the occurrence of a nuclear bomb explosion.

Unfortunately, energy which simulates the thermal energy generated during the occurrence of a nuclear bomb explosion is not a simple pulse of energy. The simulated energy must have the correct time-amplitude characteristic. It must rise in a few microseconds to a first peak, must then fall in a time which varies from a few hundredths of a second for a four-tenths (.4) megaton yield to a few tenths of a second for a twenty (20) megaton yield, must then rise again to form a second pulse—the rise of the second pulse being slow relative to the first pulse—the second pulse requiring time of the order of seconds to reach its maximum value, and the second pulse must then decay to zero value in tens of seconds; and the energy level must attain a predetermined value.

It is a primary object of this invention to provide a device which simulates the thermal energy flash generated during the occurrence of a nuclear bomb explosion.

It is another object of this invention to provide a device which is reliable in operation and economical to produce.

Other objects and many of the attendant advantages of this invention will be readily appreciated as the apparatus becomes better understood by reference to the following detailed description when considered in connection with the accompanying drawings wherein:

FIG. 1 is a graph of the level of thermal energy yield of a nuclear bomb explosion relative to time;

FIG. 3 is a partial cutaway side view illustrating the position of the energy generating means relative to each other; and FIG. 4 is a partial front view illustrating the energy generating means.

Similar reference characters refer to similar parts throughout the several views of the drawings.

Figure 2:
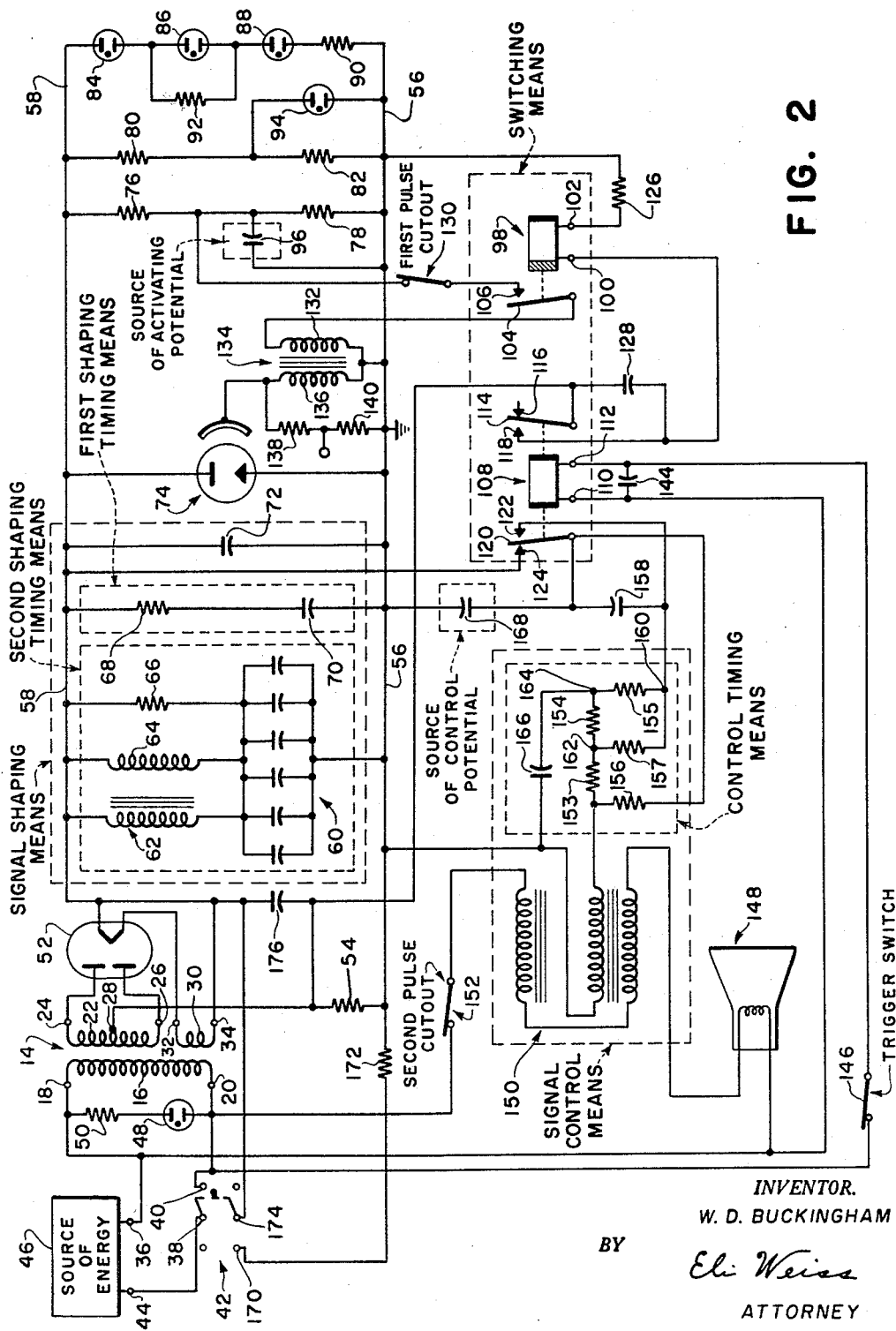
FIG. 2 is a schematic diagram in accordance with the principles of this invention.

Very briefly, a photoflash lamp and a photospot lamp are energized sequentially—the photoflash lamp being energized with a pulse of current having a first predetermined wave shape, and the photospot lamp being energized with a pulse of current having a second predetermined wave shape, the combination forming an invention which simulates the thermal energy flash generated by the occurrence of a nuclear bomb explosion.

With reference to FIG. 1, there is illustrated in graph form the variation of intensity of thermal radiation of a nuclear explosion relative to time. It is the waveshape illustrated in FIG. 1 which is reproduced by this invention.

A careful examination of the waveshape of FIG. 1 will disclose that there are two distinct pulses of thermal energy—a first pulse 10 which has a fast rise-short duration pulse of energy; and a second pulse 12 which has a relatively slow rise-long duration pulse of energy. A valley of relatively little thermal energy occurs between the first and second pulse. The relative proportions of the pulses of the curve are the same for all bomb sizes, however, the actual intensity and time values each increase as the yield of the nuclear bomb blast increases.

In nuclear bombs which have energy yields which range in values from four tenths (.4) to twenty (20) megatons, the first pulse rises to its peak value within a few microseconds, and then falls to a minimum value in a time duration which varies from a few hundredths of a second for a four tenths (.4) megaton bomb blast yield to a few tenths of a second for a twenty (20) megaton bomb blast yield. The second peak rises relatively slowly and requires a time duration in the order of seconds to reach its maximum value and tens of seconds to decay to zero.

A substantial portion of the thermal radiation form of energy from a nuclear bomb occurs within a range of wavelengths which extend from four-tenths (.4) to one-and-one-tenth (1.1) microns; and while the scales of FIG. 1 are not absolute, the first energy pulse 10 has a rise time that is in the order of thirty (30) microseconds or less and does contain a substantial amount of energy; and the second energy pulse 12 also rises to a high value and contains a very large amount of energy.

With reference to FIG. 2, there is provided a transformer 14 which supports a primary winding 16 having end terminals 18, 20; and secondary winding 22 having end terminals 24, 26, and a tap terminal 28; and another secondary winding 30 having end terminals 32, 34. End terminal 18 is connected directly to an input terminal 36; and end terminal 20 is connected through two contacts 38, 40 of a double pole-double throw switch 42 to an input terminal 44. A source of energy 46 is connected to feed 120 volts A.C. to the input terminals 36, 44.

The series combination of a glow discharge lamp 48 such as a neon lamp or the like, and a resistor 50 are connected in parallel with the primary winding 16.

A rectifier type vacuum tube 52 is connected to the secondary windings 22, 30 to provide D.C. The winding 30 is connected to the cathode of the rectifier tube 52, and the end terminals of the secondary winding 22 are each connected to an anode terminal of the rectifier tube 52. The center tap terminal 28 is coupled through an impedance 54 to a conductor 56, and the terminal 34 of the winding 30 is connected to a conductor 58.

Six capacitors 60 each rated at 525 microfarads are connected in parallel to provide a desired total value. One terminal of the capacitors 60 is connected to conductor 56; and the other terminal is coupled through an iron-core inductor 62 to conductor 58, through an air-core inductor 64 to conductor 58, and through a resistor 66 to conductor 58. Additionally, connected between the conductors 58, 56 are the following: a resistor 68 connected in series with a capacitor 70; a capacitor 72; a photoflash tube 74 such as an Amglo 5GJ2ZA or the like; a resistor 76 connected in series with a resistor 78; a resistor 80 connected in series with a resistor 82; and three voltage regulating lamps 84, 86, 88 connected in series with each other and in series with a resistor 90.

The capacitor 70 and resistor 68 function as a first shaping timing means; and the capacitor 60, inductor 62, inductor 64, and resistor 66 function as a second shaping timing means. The first shaping timing means, the second shaping timing means, and the capacitor 72 form a signal shaping means which shapes or controls the waveshape of the signal fed to the photoflash lamp 74.

An impedance 92 is connected in parallel with the lamp 86. A glow discharge tube 94 such as a neon lamp or the like is connected between the conductor 56 and the junction of the resistors 80, 82; and a capacitor 96 is connected between the conductor 56 and the junction of the resistors 76, 78.

A slow acting D.C. relay 98 supports a winding having two end terminals 100, 102; and a movable contact 104 which cooperates with a stationary contact 106.

An A.C. relay 108 supports a winding having two end terminals 110, 112; a movable contact 114 which cooperates with stationary contacts 116, 118; and a movable contact 120 which cooperates with stationary contact 122, 124.

The two relays, the A.C. relay 108 and the D.C. relay 98 form a switching means which permits the sequential activation of the photoflash lamp 74 and a photospot lamp 148.

The end terminal 102 is coupled through an impedance 126 to the conductor 56, and the end terminal 100 is connected to the stationary contact 118 of relay 108. Movable contact 114 is connected through a capacitor 128 to a stationary contact 118, and also to the center tap terminal 28 of winding 22. Stationary contact 106 is connected through a first pulse cutout switch 130 to the common terminal of resistors 76, 78; and movable contact 104 is coupled through the primary winding 132 of a spark coil 134 to conductor 56. The secondary winding 136 of the spark coil is connected between the conductor 56 and the photoflash lamp 74, and is also connected in parallel with two resistors 138, 140 connected in series with each other.

The end terminal 112 is connected through a capacitor 144 to end terminal 110; and through a trigger switch 146 to the contact 40 of switch 42. End terminal 110 is connected to the input terminal 36, and through a photospot lamp 148, a three legged reactor 150, and a second pulse cutout switch 152 to the contact 40 of switch 42.

Three resistors 154, 155, 157 are connected together to form a delta network having terminals 160, 162, 164. Terminal 162 is connected through a resistor 153 and the D.C. control winding of the three legged reactor 150 to the conductor 56. The junction of the resistor 153 and the D.C. control winding of the reactor is coupled through a resistor 156 to the movable contact 120. Terminal 160 is coupled through a capacitor 158 to the movable contact 120; and terminal 164 is coupled through a capacitor 166 to conductor 56. A capacitor 168 is positioned between the conductor 56 and the movable contact 120.

The delta network of resistors 154, 155, 157 in combination with the resistor 156, resistor 153, and capacitor 166 forms a control timing means which, together with the reactor 150 forms a signal control means to control the signal from the source of energy 46 fed to the photospot lamp 148.

A contact 170 of the switch 42 is connected through a resistor 172 to conductor 56; and contact 174 of switch 42 is connected to end terminal 34 of winding 30, and through capacitor 176 to 28, the center tap of winding 22.

In operation, the double-pole double-throw switch 40 is urged manually to the right hand position to connect the two upper contacts 38, 40 together to permit 120 v. A.C. power to flow from the source of energy 46 to the primary winding 16 of the transformer 14. This switch 42, when positioned to the left or to its off position connects a one hundred and fifty (150) ohm discharge resistor 172 across the high voltage capacitors. This is a safety feature which assures that there will not be any charge on the capacitors when the structure is turned off. The neon lamp 48 connected across the primary winding 16 of the transformer indicates the presence or absence of power.

Application of power to the primary winding 16 activates the rectifier tube 52 and the various capacitors are charged to four hundred and fifty (450) volts. This potential is controlled by the three voltage regulator lamps 84, 86, 88. Immediately after the capacitors become fully charged the neon lamp 94 glows to indicate that this invention is now in a ready state and can be operated when desired.

To operate, the trigger switch 146 is closed and 120 v. A.C. is applied to the winding of the A.C. relay 108. A capacitor 144 is connected in shunt with the winding to prevent the generation of transients. Immediately after the relay 108 is energized, the movable contact 120 is urged from stationary contact 124 to stationary contact 122; and movable contact 114 is urged from stationary contact 116 to stationary contact 118.

The urging of the movable contact 120 towards the stationary contact 122 feeds a signal from a source of control potential by discharging a five hundred twenty five (525) mfd. four hundred fifty (450) voltage capacitor 168. This signal is fed through the control timing means and a D.C. control winding of a three legged reactor 150 to shape the current pulse fed to the photospot lamp 148. However, the control timing means responds slowly to variations in the input signal and, therefore, its activation must be initiated prior to the occurrence of the first flash.

The urging of the movable contact 114 towards the stationary contact 118 of the relay 108 activates the winding of relay 98, and the movable contact 104 is urged towards 106. The closing of contacts 104, 106 feeds a signal from a source of activating potential by discharging capacitor 96 through the primary 132 of spark coil 134. This signal initiates activation of the photoflash lamp 74 to permit generation of the first flash.

Each of the sets of contacts of the relay 108 are shunted with a .05 mfd. 400 volt capacitor, it being understood, however, that this value is not critical. The slow acting D.C. relay 98 is utilized to delay the initiation of the first pulse a time duration sufficient to permit the heavy filament of the photospot lamp to be preheated to allow it to light up in proper time relationship to the first pulse.

The contacts 104, 106 of the slow acting D.C. relay 98 close the circuit from the one mfd. four hundred volt capacitor 96, which is charged to 225 volts, to the primary winding 132 of the spark coil 134. The signal generated in the secondary winding 136 is fed to the control electrode of/and activates the photoflash lamp 74. A first pulse cutout switch 130 interposed between the capacitor 96 and the contact 106 permits the interruption of the electrical path to prevent selectively the activation of the photoflash tube 74. A second pulse cutout switch 152 connected in series with the photospot lamp permits the selective interruption of the operation of the photospot lamp. Thus, a first switch is provided to prevent selectively the generation of the first generated light flash; and a second switch is provided to prevent selectively the generation of the second generated light flash. This feature is provided for test or demonstration purposes.

The discharge of the one mfd. capacitor 96 through the primary winding 132 of the spark coil 134 generates a high potential signal across the secondary winding 136 and, therefore, a high potential signal on the control electrode of the photoflash lamp. A voltage divider composed of resistors 138, 140 is connected to the control electrode to provide reduced potential which can be used to trigger the sweep of an oscilloscope if it is desired to observe the waveshape of the flash.

The high potential signal fed to the control electrode of the photoflash tube causes it to break down and become conductive. Immediately the six (6) mfd. six hundred (600) volt capacitor 72 discharges rapidly through the tube as it is positioned in close proximity to the photoflash tube and connected to the photoflash tube with short, low-inductance leads. The very rapid discharge of the charge on the capacitor 72 through the photoflash tube 74 caused the light generated to rise very rapidly.

Ordinarily, the charge on capacitor 72 would be dissipated very rapidly. However, additional energy is fed to the photoflash lamp from the eighty (80) mfd. four hundred fifty (450) volt capacitor 70 timed with a three point four (3.4) ohm resistor 68 and six capacitors 60 each having a rating of five hundred twenty five (525) mfd. at four hundred fifty (450) volts timed with the combination of an iron core inductor 62 and an air core inductor 64 each positioned in parallel with a thirty (30) ohm resistor 66.

Extreme care is required in adjusting the capacitor and timing circuit values to generate the exact light pulse required.

In operation, first the intensity of the first pulse rises to a maximum value and then starts to fall, and then the intensity of the light from the photospot lamp rises to a maximum value and then falls relatively slowly to produce the second flash of light. The waveshape of the second flash of light is determined by the signal control means, and the waveshape of the first flash of light is determined by the signal shaping means.

The structure disclosed in FIG. 2 will produce light the intensity of which is equal to that produced at a distance of twenty miles by a blast having a yield of .4 megatons under conditions of dense fog to give only 2½% of the normal transmission when composed of components having the following values:

Resistors:
| | |
|---|---|
| 50 | 200,000 ohms. |
| 66 | 150 ohms. |
| 76 | 100,000 ohms. |
| 78 | 100,000 ohms. |
| 80 | 1,000,000 ohms. |
| 82 | 100,000 ohms. |
| 90 | 200 ohms. |
| 92 | 1,000,000 ohms. |
| 126 | 3,000 ohms. |
| 138 | 1,000,000 ohms. |
| 140 | 100 ohms. |
| 153 | 1,000 ohms. |
| 154 | 1,500 ohms. |
| 155 | 1,500 ohms. |
| 156 | 35,000 ohms. |
| 157 | 4,000 ohms. |
| 172 | 150 ohms. |

Capacitors:
| | |
|---|---|
| 60 (6) | 525 µf. 450 volts. |
| 70 | 80 µf. 450 volts. |
| 72 | 6 µf. 600 volts. |
| 96 | 1 µf. 400 volts. |
| 128 | .05 µf. 400 volts. |
| 144 | .05 µf. 400 volts. |
| 158 | .05 µf. 400 volts. |
| 166 | 535 µf. 450 volts. |
| 168 | 535 µf. 450 volts. |
| 176 | 4 µf. 600 volts. |

Tubes:
| | |
|---|---|
| 52 | 5U4G. |
| 74 | Amglo 56J2ZA. |
| 84 | OA2. |
| 86 | OA2. |
| 88 | OA2. |
| 94 | NE51. |
| 48 | NE51. |
| 148 | 120 v. 500 w. PH/RSP2 reflector photospot. |

Inductors:
| | |
|---|---|
| 62 | 2.35H 15.5 ohms 1400t #22 EI13 core .025 gap. |
| 64 | 8 mh., 11.4 ohms. |

The value of the components have been presented to provide a most complete disclosure, it being understood, however, that this invention is not limited to structure using components having these values, and that other components having other values can be utilized.

With reference to FIG. 3, as indicated previously, two types of lamps are used to reproduce a flash having the waveshape illustrated in FIG. 1—a photoflash lamp 74 which generates the first flash, and a photospot lamp 148 which generates the second flash. Physically, the photoflash lamp 74 is positioned in front of and on the optical axis of the photospot lamp 148. The photoflash lamp is small relative to the photospot lamp and, therefore, does not block a significant amount of the light produced by the photospot lamp. A wire screen neutral-density filter 178 swingably supported by a bracket member 180 can be positioned in front of the lamps to permit the amplitude of the flash to be reduced selectively by a given percentage.

Obviously, many modifications and variations of the present invention are possible in the light of the above teachings. It is, therefore, to be understood that within the scope of the appended claims the invention may be practiced otherwise than as specifically described.

What is claimed is:

1. A flash simulator comprising a photospot lamp to generate a second occurring flash of light, a signal control means interposed between a source of energy and said first lamp to control the signal from the source of energy fed to said photospot lamp, a photoflash lamp to generate a first occurring flash of light, signal shaping means coupled to said photoflash lamp to control the waveshape of the signal fed to said photoflash lamp, and switching means coupled to first initiate activation of said photospot lamp and then initiate activation of said photoflash lamp.

2. A flash simulator comprising a first lamp to generate a second occurring flash of light, signal control means interposed between a source of energy and said first lamp to control the signal from the source of energy fed to said first lamp, a second lamp to generate a first occurring flash of light, a first relay coupled to feed a control signal to said signal control means to initiate activation of said first lamp, a second relay operated by said first relay to feed an activating signal to said second lamp after the occurrence of the signal to initiate activation of said first lamp, and a signal shaping means coupled to feed a signal having a desired waveshape to said activated second lamp.

3. A flash simulator comprising a photospot lamp to generate a second occurring flash of light, signal control means interposed between a source of energy and said photospot lamp to control the signal from the source of energy fed to said photospot lamp, a photoflash lamp to generate a first occurring flash of light, a first relay coupled to feed a control signal to said signal control means to initiate activation of said photospot lamp, a slow acting relay operated by said first relay to feed an activating signal to said photoflash lamp after the occurrence of the signal to initiate activation of said photospot lamp, and a signal shaping means coupled to feed a signal having a desired waveshape to said activated photoflash lamp.

4. A flash simulator comprising a first lamp to generate a second occurring flash of light, a reactor supporting a control winding interposed between a source of energy and said first lamp to control the signal from the source of energy fed to said first lamp, a timing means coupled to said control winding of said reactor, a second lamp to generate a first occurring flash of light, a first relay coupled to feed a control signal to said timing means to initiate activation of said first lamp, a second relay operated by said first relay to feed an activating signal to said second lamp after the occurrence of the signal to initiate activation of said first lamp, and a signal shaping means coupled to feed a signal having a desired waveshape to said activated second lamp.

5. A flash simulator comprising a photospot lamp to generate a second occurring flash of light, a reactor supporting a control winding interposed between a source of energy and said photospot lamp to control the signal from the source of energy fed to said photospot lamp, timing means coupled to said control winding of said reactor, a photoflash lamp to generate a first occurring flash of light, a first relay coupled to feed a control signal to said timing means to initiate activation of said photospot lamp, a slow acting relay operated by said first relay to feed an activating signal to said photoflash lamp after the occurrence of the signal to initiate activation of said photospot lamp, and a signal shaping means coupled to feed a signal having a desired waveshape to said activated photoflash lamp.

6. A flash simulator comprising a first lamp to generate a second occurring flash of light, signal control means interposed between a source of energy and said first lamp to control the signal from the source of energy fed to said first lamp, a second lamp to generate a first occurring flash of light, a first relay coupled to feed a control signal to said signal control means to initiate activation of said first lamp, a second relay operated by said first relay to feed an activating signal to said second lamp after the occurrence of the signal to initiate activation of said first lamp, a capacitor coupled to feed a signal to said activated second lamp, a first shaping timing means coupled to feed a signal to said activated second lamp, and a second shaping timing means coupled to feed a signal to said activated second lamp.

7. A flash simulator comprising a photospot lamp to generate a second occurring flash of light, signal control means interposed between a source of energy and said first lamp to control the signal from the source of energy fed to said photospot lamp, a photoflash lamp to generate a first occurring flash of light, a first relay coupled to feed a control signal to said signal control means to initiate activation of said photospot lamp, a slow acting relay operated by said first relay to feed an activating signal to said photoflash lamp after the occurrence of the signal to initiate activation of said first lamp, a capacitor coupled to feed a signal to said activated photoflash lamp, a first shaping timing means coupled to feed a signal to said activated photoflash lamp, and a second shaping timing means coupled to feed a signal to said activated photoflash lamp.

8. A flash simulator comprising a first lamp to generate a second occurring flash of light, a reactor supporting a control winding interposed between a source of energy and said first lamp to control the signal from the source of energy fed to said first lamp, a timing means coupled to said control winding of said reactor, a second lamp to generate a first occurring flash of light, a first relay coupled to feed a control signal to said timing means to initiate activation of said first lamp, a second relay operated by said first relay to feed an activating signal to said second lamp after the occurrence of the signal to initiate activation of said first lamp, a capacitor coupled to feed a signal to said activated second lamp, a first shaping timing means coupled to feed a signal to said activated second lamp, and a second shaping timing means coupled to feed a signal to said activated second lamp.

9. A flash simulator comprising a photospot lamp to generate a second occurring flash of light, a reactor supporting a control winding interposed between a source of energy and said photospot lamp to control the signal from the source of energy fed to said photospot lamp, timing means coupled to said control winding of said reactor, a photoflash lamp to generate a first occurring flash of light, a first relay coupled to feed a control signal to said timing means to initiate activation of said photospot lamp, a slow acting relay operated by said first relay to feed an activating signal to said photoflash lamp, after the occurrence of the signal to initiate activation of said photospot lamp, a capacitor coupled to feed a signal to said activated photoflash lamp, a first shaping timing means coupled to feed a signal to said activated photoflash lamp, and a second shaping timing means coupled to feed a signal to said activated photoflash lamp.

10. A flash simulator comprising a first lamp to generate a second occurring flash of light, signal control means interposed between a source of energy and said first lamp to control the signal from the source of energy fed to said first lamp, a second lamp to generate a first occurring flash of light, a source of control energy, a first relay coupled to feed a control signal from said source of control energy to said signal control means to initiate activation of said first lamp, a source of activating energy, a second relay operated by said first relay to feed an activating signal from said source of activating energy to said second lamp to initiate activation of said second lamp after the occurrence of the signal to initiate activation of said first lamp, and a signal shaping means coupled to feed a signal having a desired waveshape to said activated second lamp.

11. A flash simulator comprising a photospot lamp to generate a second occurring flash of light, signal control means interposed between a source of energy and said photospot lamp to control the signal from the source of energy fed to said photospot lamp, a photoflash lamp to generate a first occurring flash of light, a first capacitor to support a control signal, a first relay coupled to feed the control signal on said first capacitor to said signal control means to initiate activation of said photospot lamp, a second capacitor to support an activating signal, a spark coil, a second relay operated by said first relay to feed the activating signal from said second capacitor through said spark coil to said photoflash lamp to initiate activation of said photoflash lamp after the occurrence of the signal to initiate activation of said photospot lamp, and a signal shaping means coupled to feed a signal having a desired waveshape to said activated photoflash lamp.

12. A flash simulator comprising a first lamp to generate a second occurring flash of light, a reactor supporting a control winding interposed between a source of energy and said first lamp to control the signal from the source of energy fed to said first lamp, a timing means coupled to said control winding of said reactor, a second lamp to generate a first occurring flash of light, a source of control energy, a first relay coupled to feed a control signal from said source of control energy to said timing means to initiate activation of said first lamp, a source of activating energy, a second relay operated by said first relay to feed an activating signal from said source of activating energy to said second lamp to initiate activation of said second lamp after the occurrence of the signal to initiate activation of said first lamp, and a signal shaping means coupled to feed a signal having a desired waveshape to said activated second lamp.

13. A flash simulator comprising a first lamp to generate a second occurring flash of light, a reactor supporting a control winding interposed between a source of energy and said first lamp to control the signal from the source of energy fed to said first lamp, a timing means coupled to said control winding of said reactor, a second lamp to generate a first occurring flash of light, a first capacitor to support a control signal, a first relay coupled to feed the control signal on said first capacitor to said timing means to initiate activation of said first lamp, a second capacitor to support an activating signal, a spark coil, a second relay operated by said first relay to feed the activating signal from said second capacitor through said spark coil to said second lamp to initiate activation of said second lamp after the occurrence of the signal to initiate activation of said first lamp, and a signal shaping means coupled to feed a signal having a desired waveshape to said activated second lamp.

14. A flash simulator comprising a photospot lamp to generate a second occurring flash of light, a reactor supporting a control winding interposed between a source of energy and said photospot lamp to control the signal from the source of energy fed to said photospot lamp, timing means coupled to said control winding of said reactor, a photoflash lamp to generate a first occurring flash of light, a first capacitor to support a control signal, a first relay coupled to feed the control signal on said first capacitor to said timing means to initiate activation of said photospot lamp, a second capacitor to support an activating signal, a spark coil, a slow acting relay operated by said first relay to feed the activating signal from said second capacitor through said spark coil to initiate activation of said photoflash lamp after the ocurrence of the signal to initiate activation of said photospot lamp, and a signal shaping means coupled to feed a signal having a desired waveshape to said activated photoflash lamp.

15. A flash simulator comprising a first lamp to generate a second occurring flash of light, a signal control means interposed between a source of energy and said first lamp to control the signal from the source of energy fed to said first lamp, a second lamp to generate a first occurring flash of light, a source of control energy, a first relay coupled to feed a control signal from said source of control energy to said signal control means to initiate activation of said first lamp, a source of activating energy, a second relay operated by said first relay to feed an activating signal from said source of activating energy to initiate activation of said second lamp after the occurrence of the signal to initiate activation of said photospot lamp, a capacitor coupled to feed a signal to said activated second lamp, a first shaping timing means coupled to feed a signal to said activated second lamp, and a second shaping timing means coupled to feed a signal to said activated second lamp.

16. A flash simulator comprising a photospot lamp to generate a second occurring flash of light, a reactor supporting a control winding interposed between a source of energy and said photospot lamp to control the signal from the source of energy fed to said photospot lamp, a timing means coupled to said control winding of said reactor, a photoflash lamp to generate a first occurring flash of light, a source of control energy, a first relay coupled to feed a control signal from said source of control energy to said timing means to initiate activation of said photospot lamp, a source of activating energy, a slow acting relay operated by said first relay to feed an activating signal from said source of activating energy to initiate activation of said photoflash lamp after the occurrence of the signal to initiate activation of said photospot lamp, a capacitor coupled to feed a signal to said activated photoflash lamp, a first shaping timing means coupled to feed a signal to said activated photoflash lamp, and a second shaping timing means coupled to feed a signal to said activated photoflash lamp.

17. A flash simulator comprising a photospot lamp to generate a second occurring flash of light, a reactor supporting a control winding interposed between a source of energy and said photospot lamp to control the signal from the source of energy fed to said photospot lamp, a timing means coupled to said control winding of said reactor, a photoflash lamp to generate a first occurring flash of light, a first capacitor to support a control signal, a first relay coupled to feed the control signal on said first capacitor to said timing means to activate said photospot lamp, a second capacitor to support an activating signal, a spark coil, a slow acting relay operated by said first relay to feed the activating signal from said second capacitor through said spark coil to initiate activation of said photoflash lamp, a third capacitor coupled to feed a signal to said activated photoflash lamp, a first shaping timing means coupled to feed a signal to said activated photoflash lamp, and a second shaping timing means coupled to feed a signal to said activated photoflash lamp.

18. A flash simulator comprising a photospot lamp to generate a second occurring flash of light, a reactor supporting a control winding interposed between a source of energy and said photospot lamp to control the signal from the source of energy fed to said photospot lamp, a timing means coupled to said control winding of said reactor, a photoflash lamp to generate a first occurring flash of light, a first capacitor to support a control signal, a first relay coupled to feed the control signal on said first capacitor to said timing means to activate said photospot lamp, a second capacitor to support an activating signal, a spark coil, a slow acting relay operated by said first relay to feed the activating signal from said second capacitor through said spark coil to initiate activation of said photoflash lamp, a third capacitor coupled to feed a signal to said activated photoflash lamp, a first resistor, a fourth capacitor coupled to feed a signal through said first resistor to said activated photoflash lamp, a second resistor, a first inductor coupled in shunt with said second resistor, a second inductor coupled in shunt with said first inductor and said second resistor, and a fifth capacitor coupled to feed a signal through said second resistor, said first inductor, and said second inductor to said activated photoflash lamp.

References Cited in the file of this patent
UNITED STATES PATENTS

| | | |
|---|---|---|
| 2,272,102 | Wildman | Feb. 3, 1942 |
| 2,609,523 | Stein et al. | Sept. 2, 1952 |
| 2,622,229 | Lord | Dec. 16, 1952 |
| 2,689,929 | Rockafellow | Sept. 21, 1954 |
| 2,781,707 | Edgerton | Feb. 19, 1957 |
| 2,859,387 | Ulffers | Nov. 4, 1958 |

Champeny et al.: Electronics, vol. 32, No. 19, May 8, 1959, pages 53 to 55.

Baker et al.: Electronics, vol. 32, No. 44, Oct. 30, 1959, pages 66 to 69.